United States Patent
Xu et al.

(10) Patent No.: US 9,829,116 B2
(45) Date of Patent: Nov. 28, 2017

(54) SWITCH VALVE AND SHOWER HEAD APPLIED WITH THE SWITCH VALVE

(71) Applicant: Huasong Zhou, Xiamen, Fujian (CN)

(72) Inventors: Wencong Xu, Fujian (CN); Shigang Wang, Fujian (CN); Hailang Gong, Fujian (CN); Huasong Zhou, Fujian (CN)

(73) Assignee: Huasong Zhou, Xiamen (CN)

( * ) Notice: Subject to any disclaimer, the term of this patent is extended or adjusted under 35 U.S.C. 154(b) by 210 days.

(21) Appl. No.: 14/837,517

(22) Filed: Aug. 27, 2015

(65) Prior Publication Data

US 2017/0056897 A1  Mar. 2, 2017

(51) Int. Cl.
 *B05B 1/18*  (2006.01)
 *F16K 31/53*  (2006.01)
 *B05B 1/16*  (2006.01)
 *F16K 11/074*  (2006.01)
 *F16K 27/04*  (2006.01)

(52) U.S. Cl.
 CPC .......... *F16K 31/535* (2013.01); *B05B 1/1636* (2013.01); *F16K 11/074* (2013.01); *F16K 27/045* (2013.01); *B05B 1/18* (2013.01)

(58) Field of Classification Search
 CPC ...... F16K 31/535; F16K 31/56; F16K 11/074; F16K 27/045; B05B 1/1636; B05B 1/18–1/207; B05B 1/16–1/169
 USPC ................... 239/443, 581.1, 581.2; 251/162
 See application file for complete search history.

(56) References Cited

U.S. PATENT DOCUMENTS

| | | | | |
|---|---|---|---|---|
| 5,433,384 A * | 7/1995 | Chan | ..................... | B05B 1/1636 239/239 |
| 5,819,798 A * | 10/1998 | Claflin | ....................... | B41J 2/17 137/625.11 |
| 2005/0258274 A1* | 11/2005 | Wang | .................... | B05B 1/1636 239/393 |
| 2012/0111973 A1* | 5/2012 | Cheng | ................... | E03C 1/0409 239/214 |
| 2012/0305116 A1* | 12/2012 | Zhou | ..................... | B05B 1/1636 137/625.46 |

FOREIGN PATENT DOCUMENTS

CN          201702050 U    1/2011

* cited by examiner

*Primary Examiner* — Arthur O Hall
*Assistant Examiner* — Juan C Barrera
(74) *Attorney, Agent, or Firm* — Rabin & Berdo, P.C.

(57) ABSTRACT

A switch valve includes a fixation portion and a water diversion plate, the fixation portion, a water diversion cavity connected to an inlet waterway, at least two diversion waterways, and a water diversion plate. A universal driving shaft is rotatably connected to the fixation portion and is inserted to the water diversion cavity. The driving mechanism is connected to the universal driving shaft. The water diversion plate and the universal driving shaft rotate synchronously. The bottom of the water diversion cavity is fixedly disposed with a first gear ring. The water diversion plate is fixedly disposed with a second gear ring which engages with the first gear ring. When the driving mechanism drives the water diversion plate to rotate in a preset angle, it slides along the universal driving shaft. The inlet waterway is switched to connect to the diversion waterways by the rotation of the water diversion plate.

14 Claims, 12 Drawing Sheets

SWITCH VALVE AND SHOWER HEAD APPLIED WITH THE SWITCH VALVE

FIELD OF THE INVENTION

The present invention relates to a switch valve and a shower head applied with the switch valve.

BACKGROUND OF THE INVENTION

A switch device of shower water is disclosed in Chinese patent database in 2011.01.12 with the announcement number CN201702050U. The switch device is disposed to a shower head handle, it mainly comprises a valve sleeve, a spindle, a lock hook, a dial button and a lower cover, an upper cover; the valve sleeve is disposed with a sleeve hole running throughout up and down, the central portion is disposed with a gap groove, one side of the gap groove is fixedly disposed with an elastic element; the spindle is rotatably disposed in the sleeve hole of the valve sleeve in sealing way, the spindle is disposed with a through hole, and it is disposed with ratchets that are annularly arranged corresponding to the gap groove of the valve sleeve; the lock hook and the dial button are movably disposed above the valve sleeve, the lock hook is disposed at the ratchet of the spindle correspondingly, one end of the lock hook is fixedly connected to the dial button, the other end is locked to the ratchet of the spindle, the dial button is linked to the lock hook and it drives the spindle to rotate to switch the shower water; above components are assembled and they are disposed in the accommodating room formed by the lower cover and the upper cover, the integrate is then disposed to the shower head handle, the upper cover is disposed with an opening corresponding to the dial button. However, the structure is complicated, it needs large force to switch, thus making it operated with inconvenience.

SUMMARY OF THE INVENTION

The present invention provides a switch valve and a shower head applied with the switch valve that it overcomes the disadvantages of the existing known technology. One technical proposal of the present invention is that:

A switch valve, comprising a fixation portion and a water diversion plate, the fixation portion is disposed with an inlet waterway, a water diversion cavity connected to the inlet waterway and at least two diversion waterways, the water diversion plate is disposed in the water diversion cavity, wherein further comprising a driving mechanism and a universal driving shaft, the universal driving shaft is rotatably connected to the fixation portion and is inserted to the water diversion cavity, the driving mechanism is connected to the universal driving shaft in driving way, the water diversion plate and the universal driving shaft rotate synchronously and the water diversion plate is in sliding connection with the universal driving shaft, the bottom of the water diversion cavity is fixedly disposed with a first gear ring, the water diversion plate is fixedly disposed with a second gear ring, the first gear ring is engaged to the second gear ring, each time the driving mechanism drives the water diversion plate to rotate in a preset angle by the universal driving shaft, the water diversion slides forth and back along the universal driving shaft, the inlet waterway is switched to connect to the diversion waterways by the rotation of the water diversion plate.

In another preferred embodiment, the driving mechanism comprises a rotation plate and a driving unit, the rotation plate is fixedly connected to the universal driving shaft, the rotation plate is placed at the outer side of the water diversion cavity, the driving unit is connected to the rotation plate in driving way to drive the rotation plate to rotate.

In another preferred embodiment, the rotation plate is disposed with ratchets at the outer side to form a ratchet wheel; the driving unit comprises a button movably connected to the fixation portion, a slide block in sliding connection with the fixation portion and a pawl fixation connected to the fixation portion; the button is connected to the slide block in driving way, the button moves to drive the slide block to slide, the pawl is disposed with a dangling pawl end, the pawl end abuts against the ratchet of the ratchet wheel, the slide block abuts against the pawl, the slide block slides forth and back to make the pawl elastic deformed, so that the pawl can drive the ratchet wheel to rotate in a preset angle.

In another preferred embodiment, the driving unit further comprises a swing base, the button is pivoted joint to the fixation portion in swinging way, the swing base is pivoted joint to the fixation portion in swinging way; one end of the button abuts against one end of the swing base, so that the button swings to drive the swing base to swing, the other end of the swing base abuts against the slide block, so that the swing base swings to drive the slide block to slide.

In another preferred embodiment, the swing base is V shaped, the common end of the V shaped swing base is pivoted joint to the fixation portion, the diverging ends of the V shaped swing base are respectively coupled to the button and the slide block.

In another preferred embodiment, the fixation unit comprises a water diversion body and a fixation base, the water diversion body and the fixation base are fixedly connected together to form above mentioned water diversion cavity, the fixation base is disposed with an inlet passage, the inlet passage is connected to the water diversion cavity to form a part of the inlet waterway, the universal driving shaft is rotatably connected to the fixation base, the slide block is in sliding connection with the fixation base; the swing base is pivoted joint to the fixation base; the fixation base is fixedly disposed with a button base, the button is pivoted joint to the button base.

In another preferred embodiment, the bottom of the water diversion cavity is concaved with a concave groove, the first gear ring is disposed at the bottom of the concave groove; the bottom surface of the water diversion plate is protruding with a protruding ring, the second gear ring is disposed at the end face of the protruding ring, the protruding ring is coupled to the concave groove.

In another preferred embodiment, the preset angle is a multiple of central angle degree of each ratchet of the first gear ring, so that each time the water diversion plate rotates in a preset angle, the water diversion plate slides forth and back.

In another preferred embodiment, the first gear ring comprises first teeth that are arranged in annular array, the second gear ring comprises second teeth that are arranged in annular array, the first teeth and the second teeth are ratchets so that the water diversion plate rotates unidirectionally.

Another technical proposal of the present invention is that:

A shower head applied with the switch valve, the fixation unit further comprises a main body, an outlet cover plate and a rear cover, the main body and the rear cover are fixedly connected to form an accommodating room, the outlet cover plate, the water diversion body and the fixation base are fixedly connected in the accommodating room, the main body, the outlet cover plate and the water diversion body are fixedly connected to form above mentioned at least two diversion waterway.

Compared to the existing known technology, the technical proposal of the present invention has advantages as below:
1. on one hand, the water diversion plate rotates in a preset angle to finish up a switch action, on another hand, with the cooperation of the first gear ring and the second gear ring, when switched, the water diversion plate is lifted higher, so that the water diversion plate is slowly separated from the bottom of the water diversion cavity, it is repositioned to a close state until the switch is finished, so that it reduces the friction of the water diversion plate and the bottom of the water diversion cavity, it also reduces the switch force, thus making it labor saving and with lengthened service life.
2. the button moves to drive the slide block to slide, the slide block slides forth and back to make the pawl elastic deformed, so that the pawl can drive the ratchet wheel to rotate in a preset angle, thus achieving unidirectional rotation, the operation is convenient and the structure is compact.
3. the first teeth and the second teeth are ratchets to make the water diversion plate rotate unidirectionally, the structure can avoid the rotation plate rotating back, so that the ratchet wheel and the pawl rotate in unidirection, no rotation stopping mechanism is needed, it lengthens the service life of the button.

BRIEF DESCRIPTION OF THE DRAWINGS

The present invention will be further described with the drawings and the embodiments.

DETAILED DESCRIPTION OF THE EMBODIMENTS

Please refer to FIGS. 1-17, a switch valve comprises a fixation portion 10, a water diversion plate 20, a driving mechanism 30 and a universal driving shaft 40. The fixation portion 10 is disposed with an inlet waterway 11, a water diversion cavity 12 connected to the inlet waterway 11 and at least two diversion waterways 13, the diversion waterways 13 are respectively disposed with water diversion holes 131 at the bottom surface of the water diversion cavity 12; the water diversion plate 20 is disposed in the water diversion cavity 12, the water diversion plate 20 is disposed with a throughout water holes 21. The universal driving shaft 40 is rotatably connected to the fixation portion 10 with its one part inserted to the water diversion cavity 12, the other part is at the outer side of the water diversion cavity. Preferred, each water diversion hole is disposed with a sealing ring.

The driving mechanism 30 comprises a rotation plate 31 and a driving unit, the rotation plate 31 is fixedly connected to the part of the universal driving shaft 40 that is at the outer side of the water diversion cavity 12, the rotation plate 31 is disposed at the outer side of the water diversion cavity 12, the driving unit is connected to the rotation plate 31 in driving way to drive the rotation plate 31 to rotate. In detailed, the driving unit comprises a button 32, a swing base 33, a slide block 34 and a pawl 35. the rotation plate 31 is disposed with ratchets at the outer side to form a ratchet wheel; the button 32 is pivoted joint to the fixation portion 10 in swinging way; the swing base 33 is V shaped, the common end of the V shaped swing base is pivoted joint to the fixation portion 10, so that the swing base 33 is connected to the fixation portion 10 in swinging way; the slide block 34 is in sliding connection with the fixation portion 10; the pawl 35 is fixedly connected to the fixation portion 10 with its at least one end dangling, the dangling end forms the pawl end. One end of the button 32 abuts against one diverging end of the swing base 33, so that the button 32 swings to drive the swing base 33 to swing, the other diverging end of the swing base 33 abuts against the slide block 34, so that the swing base 33 swings to drive the slide block 34 to slide. The pawl end of the pawl 35 abuts against the ratchet of the ratchet wheel 31, the slide block 34 abuts against the pawl 35, the slide block 34 slides forth and back to make the pawl 35 elastic deformed, the pawl end of the pawl 35 abuts against the ratchet of the ratchet wheel to make the ratchet wheel 31 rotate in a preset angle, the pawl can also avoid the ratchet wheel rotating reversely.

The water diversion plate 20 and the universal driving shaft rotate synchronously, the water diversion plate 20 is in sliding connection with the portion of the universal driving shaft 40 inside the water diversion cavity 12, the water diversion plate 20 is in the water diversion cavity 12. the bottom of the water diversion cavity 12 is concaved with a concave groove 121, the bottom of the water diversion cavity 12 is fixedly disposed with a first gear ring 14, the first gear ring 14 is disposed in the groove bottom of the concave groove 121; the bottom surface of the water diversion plate 20 is protruding with a protruding ring 22, the end face of the protruding ring 22 is disposed with a second gear ring 23, the protruding ring 22 is coupled to the concave groove 121. the first gear ring 14 is engaged to the second gear ring 23.

When the ratchet wheel 31 rotates in a preset angle, the universal driving shaft 40 and the water diversion plate 20 also rotate in a preset angle, under the work of the first gear ring and the second gear ring, the water diversion plate 20 can slide at least a forth and back round along the universal driving shaft 40, on one hand, the water diversion plate 20 rotates in a preset angle to finish up a switch action, for example, the water diversion plate rotates to make the water diversion hole switched to connect to the water hole, for example, the central angle degree of each two water diversion holes is equal to the preset angle; on another hand, the water diversion plate 20 is firstly away from the cavity bottom when switched, then it is repositioned to the cavity bottom, it thus reduces the friction force and the switch force, making the switch with labor saving. In detailed structure, the first gear ring comprises first teeth that are arranged in annular array, the second gear ring comprises second teeth that are arranged in annular array, the first teeth and the second teeth are ratchets that the water diversion plate can only rotate unidirectionally, the tooth face of the first tooth is faced upwardly, the tooth face of the second tooth is faced downwardly. The preset angle is a multiple of the central angle degree of each tooth of the first gear ring, so that each time the water diversion plate rotates in a preset angle, the water diversion plate slides forth and back. Preferred, the other diverging end of the swing base 33 is disposed with a butting base 331, the butting base 331 abuts against the slide block.

Figure 1:
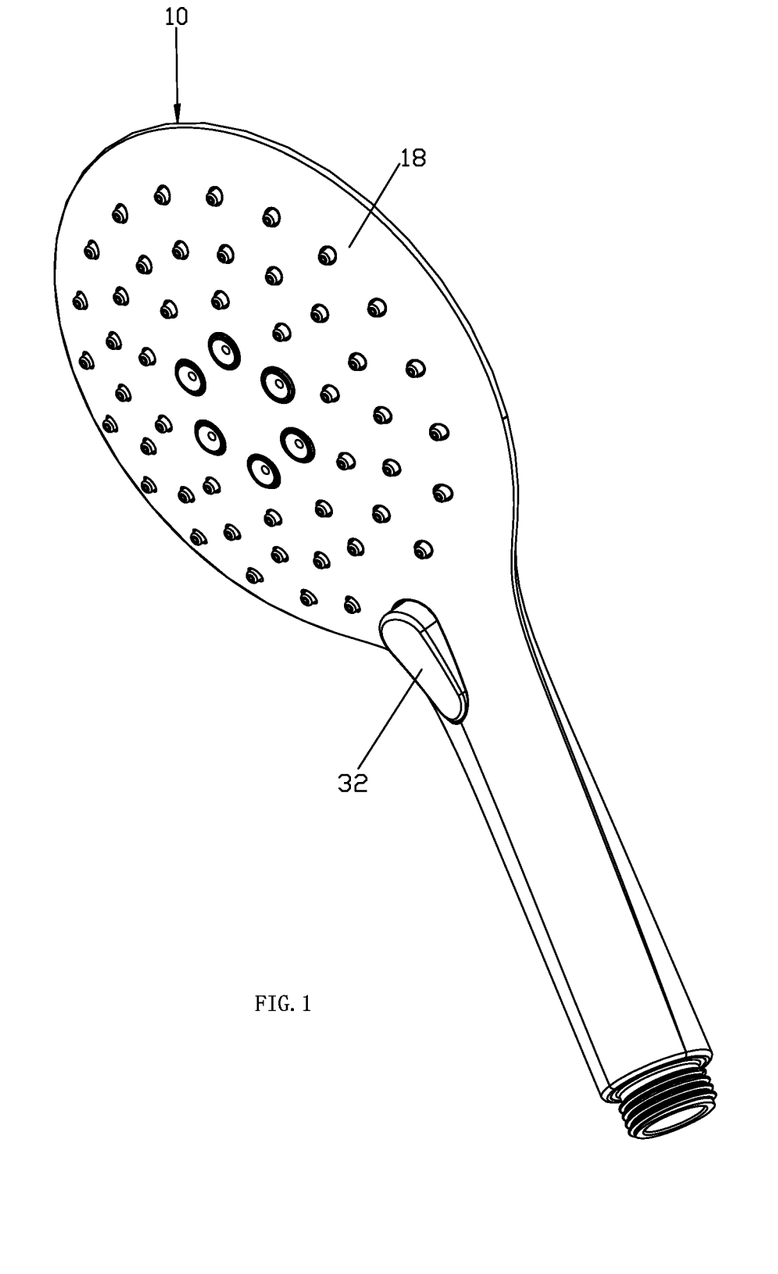
FIG. 1 illustrates a schematic diagram of a shower head of the present invention.
Figure 2:
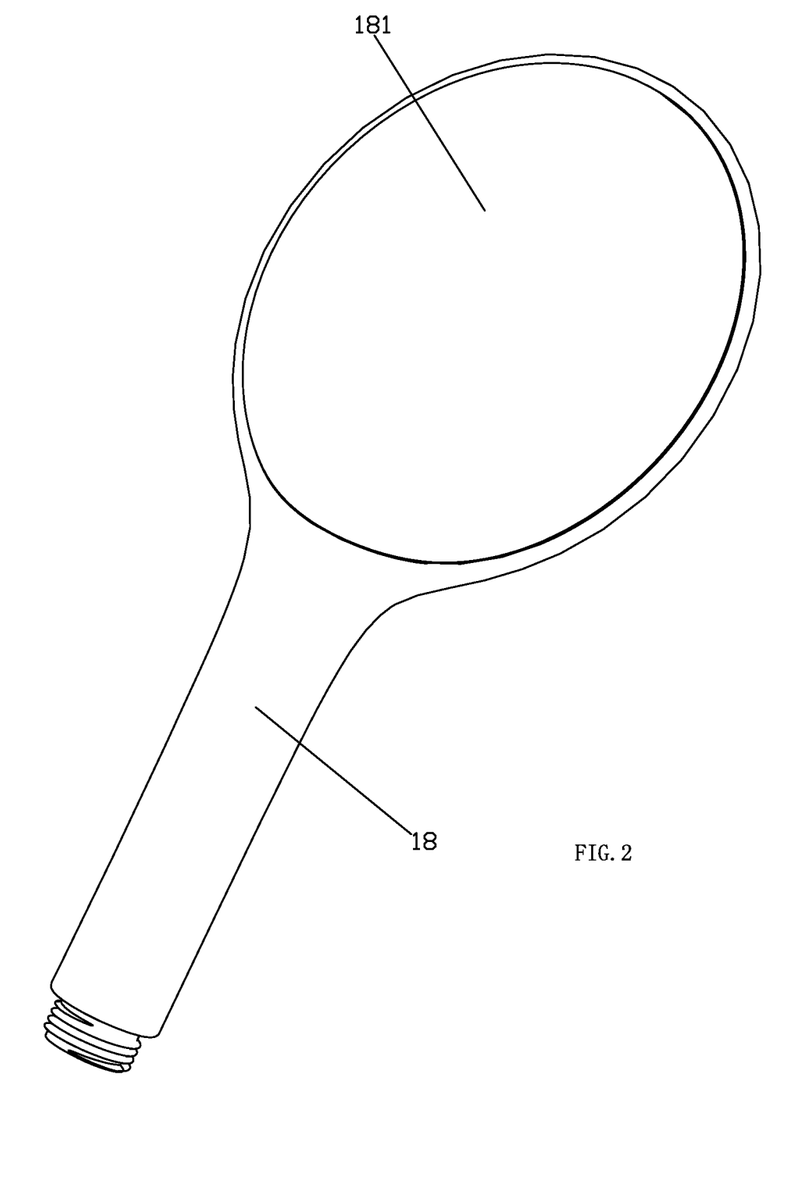
FIG. 2 illustrates another schematic diagram of the shower head.
Figure 3:
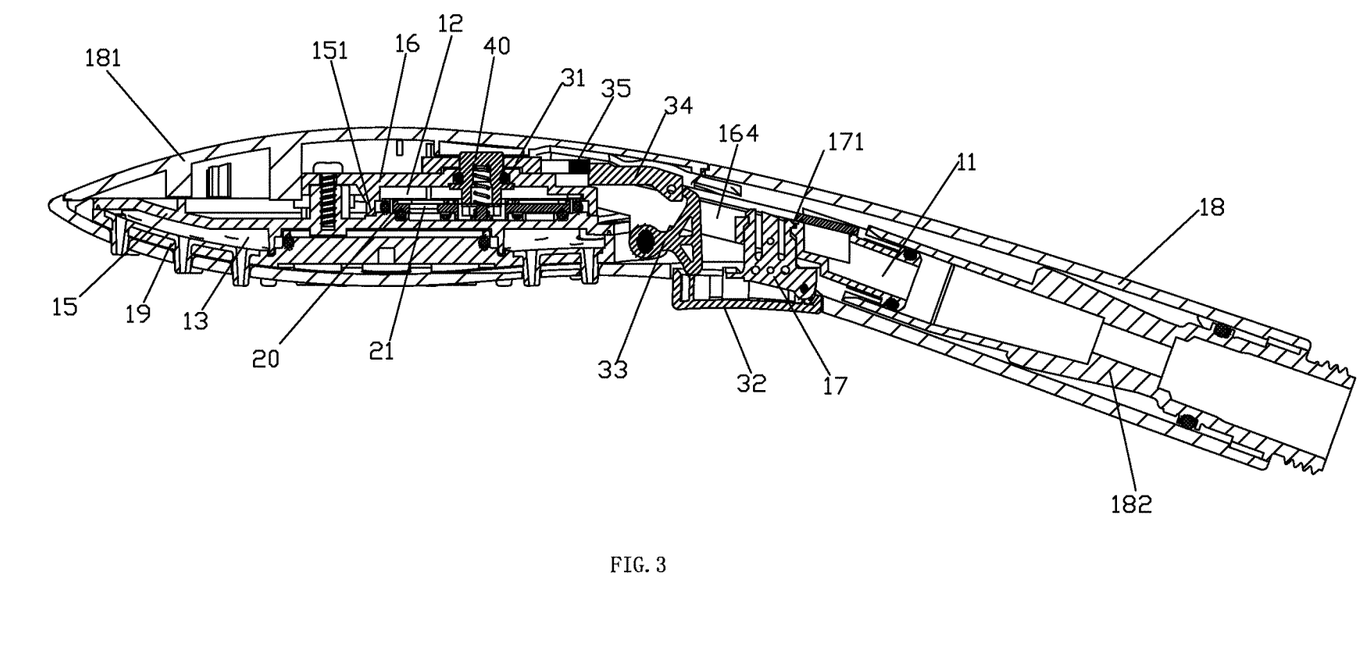
FIG. 3 illustrates a sectional diagram of the shower head.
Figure 4:
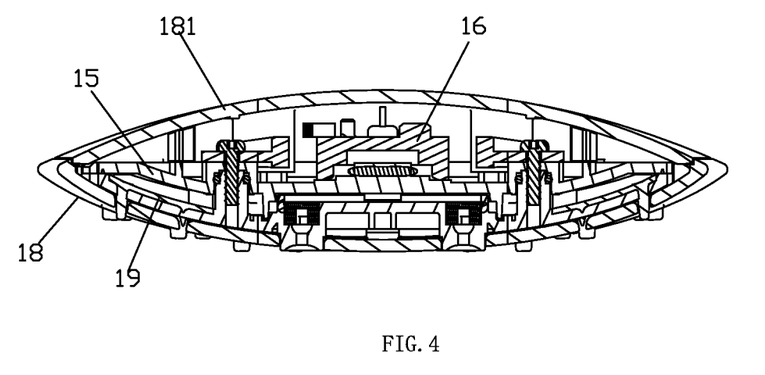
FIG. 4 illustrates another sectional diagram of the shower head.
Figure 5:
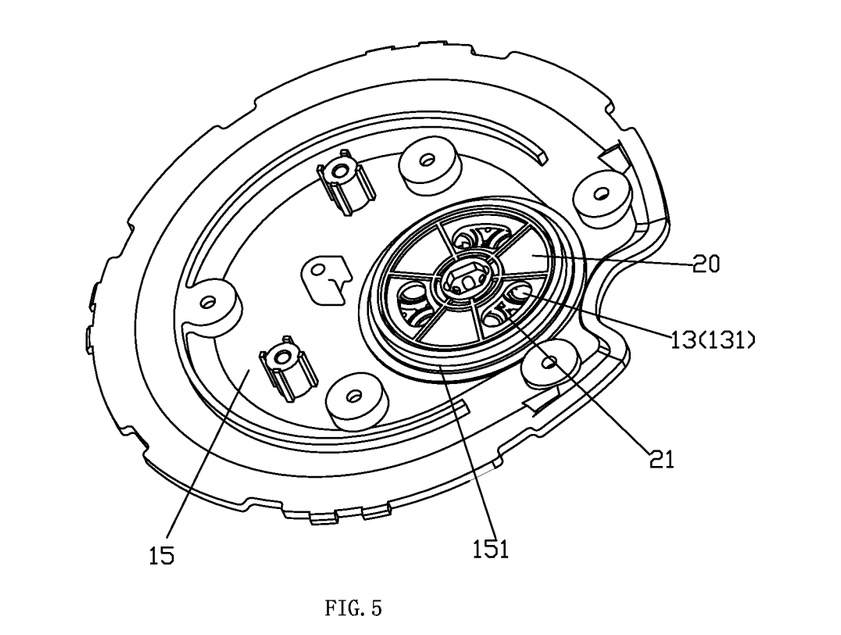
FIG. 5 illustrates a schematic diagram of the water diversion body and the water diversion plate.
Figure 6:
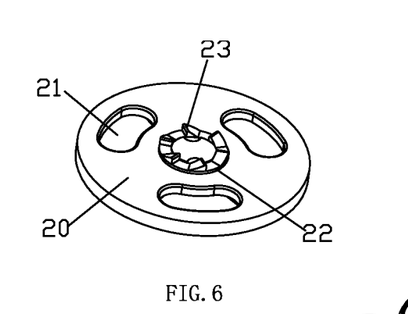
FIG. 6 illustrates a schematic diagram of the water diversion plate.
Figure 7:
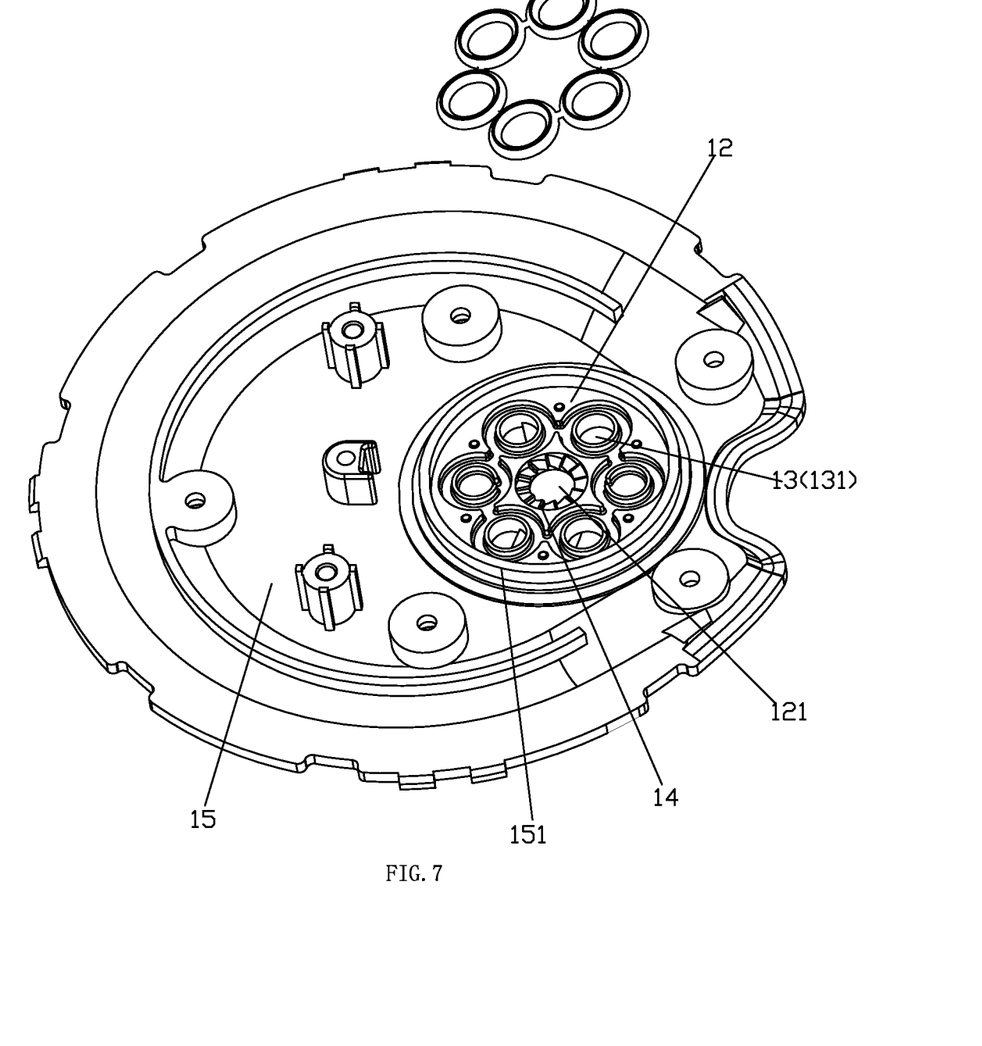
FIG. 7 illustrates an exploded and schematic diagram of the water diversion body and the sealing ring.
Figure 8:
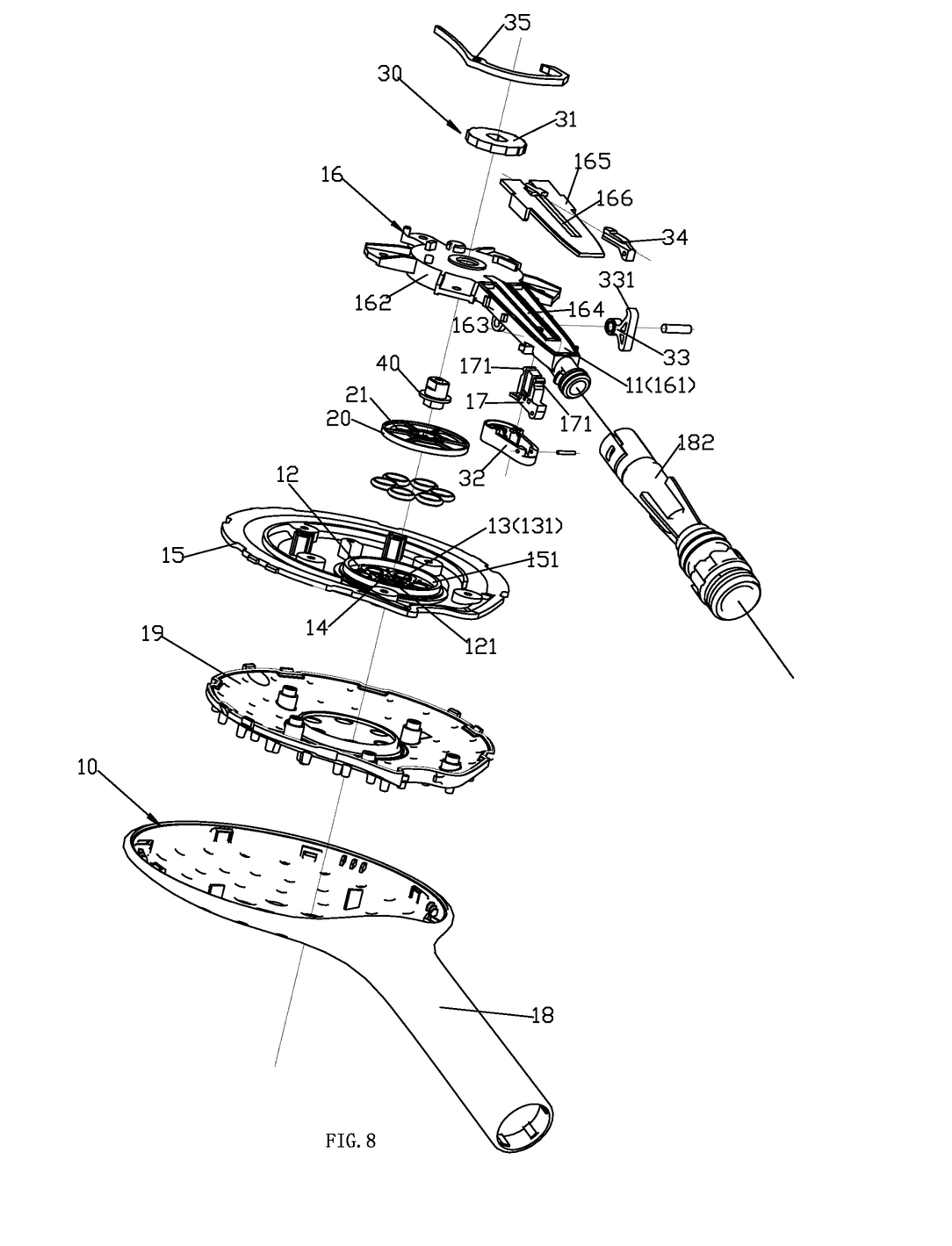
FIG. 8 illustrates an exploded and schematic diagram of a part of the shower head.
Figure 9:
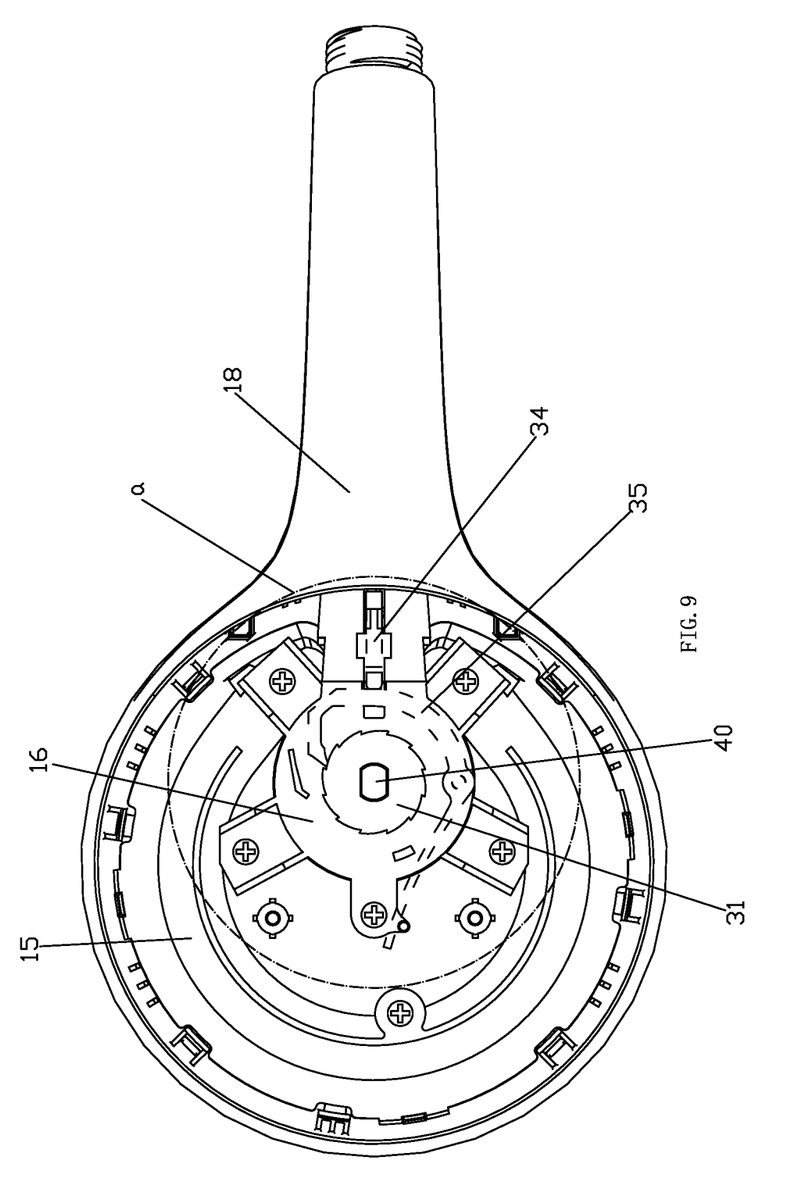
FIG. 9 illustrates a schematic diagram of a part of the shower head when the button is in the initial state, the dot line indicates the rotation plate and the pawl, the dash and dot line in a position indicates the moving locus of the pawl.
Figure 10:
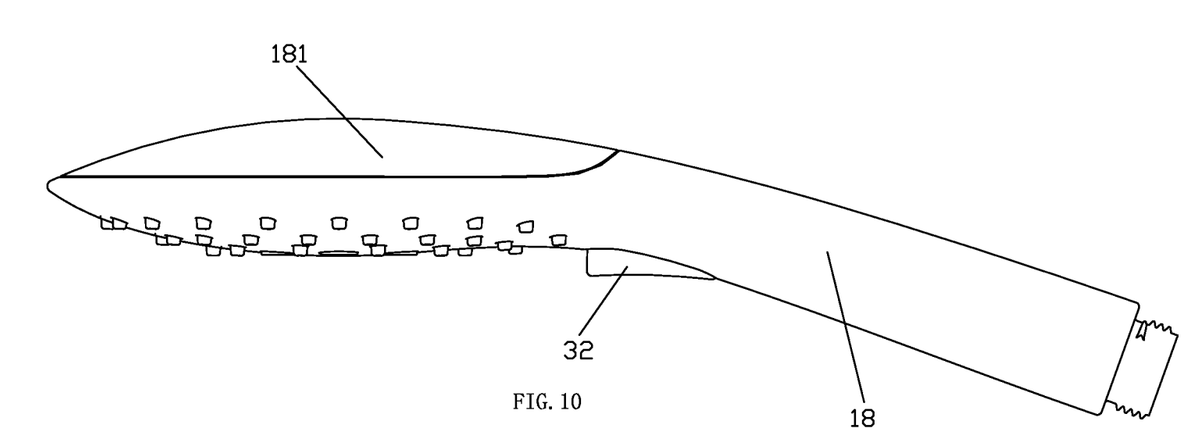
FIG. 10 illustrates a schematic diagram of the shower head when the button is in the initial state.
Figure 11:
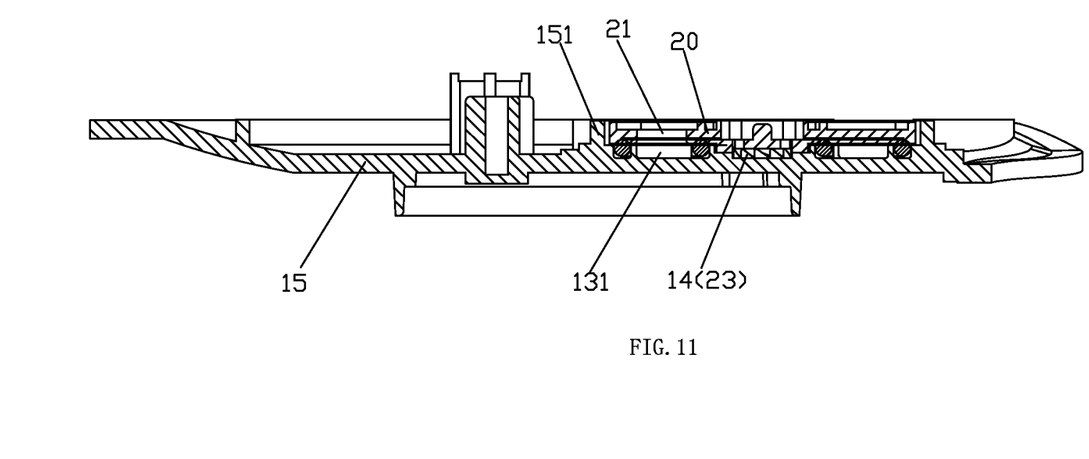
FIG. 11 illustrates a sectional diagram of the water diversion body and the water diversion plate of the shower head when the button is in the initial state.
Figure 12:
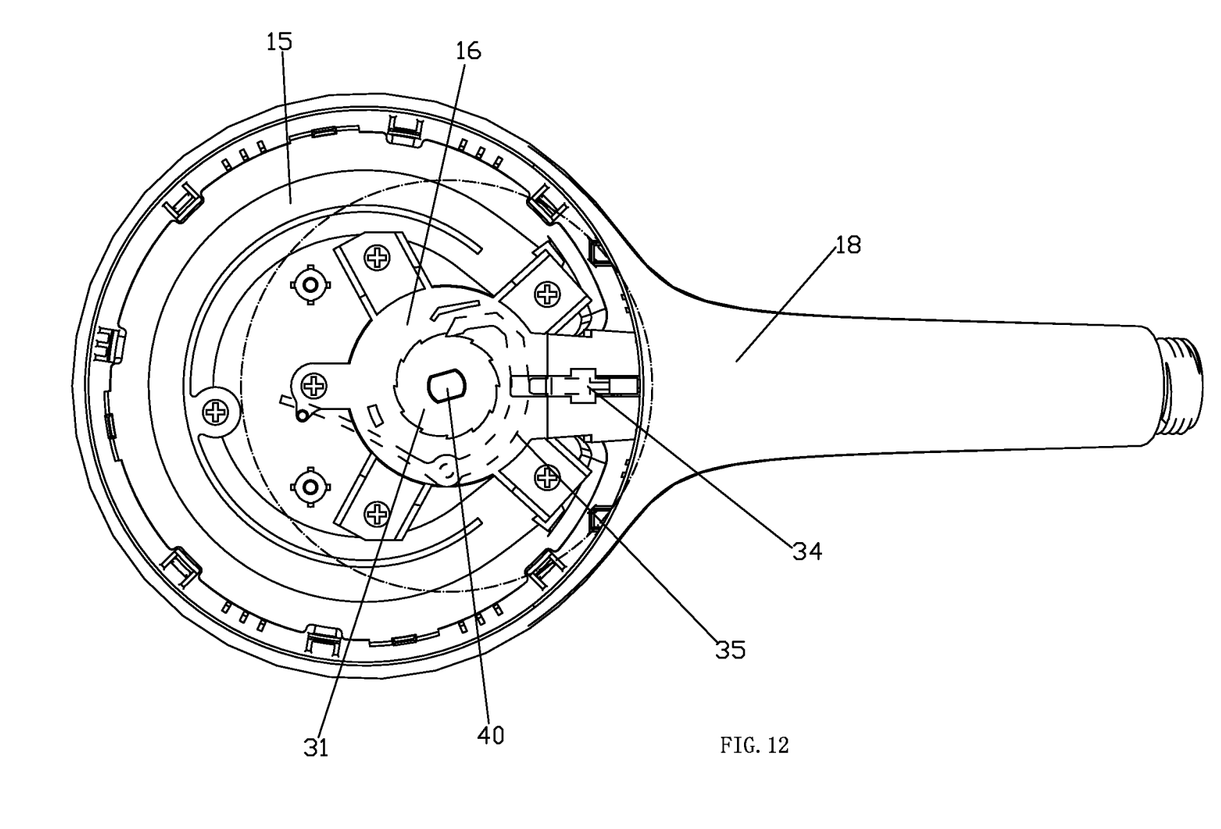
FIG. 12 illustrates a schematic diagram of a part of the shower head when the button is pressed downwardly, the dot line indicates the rotation plate and the pawl.
Figure 13:
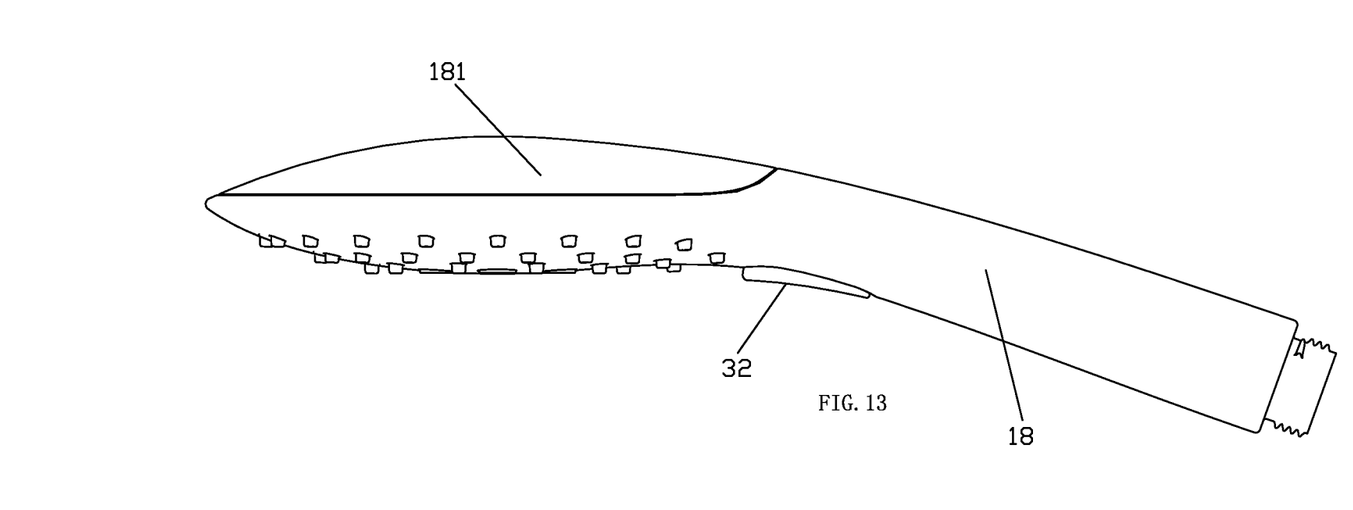
FIG. 13 illustrates a schematic diagram of the shower head when the button is pressed downwardly.
Figure 14:
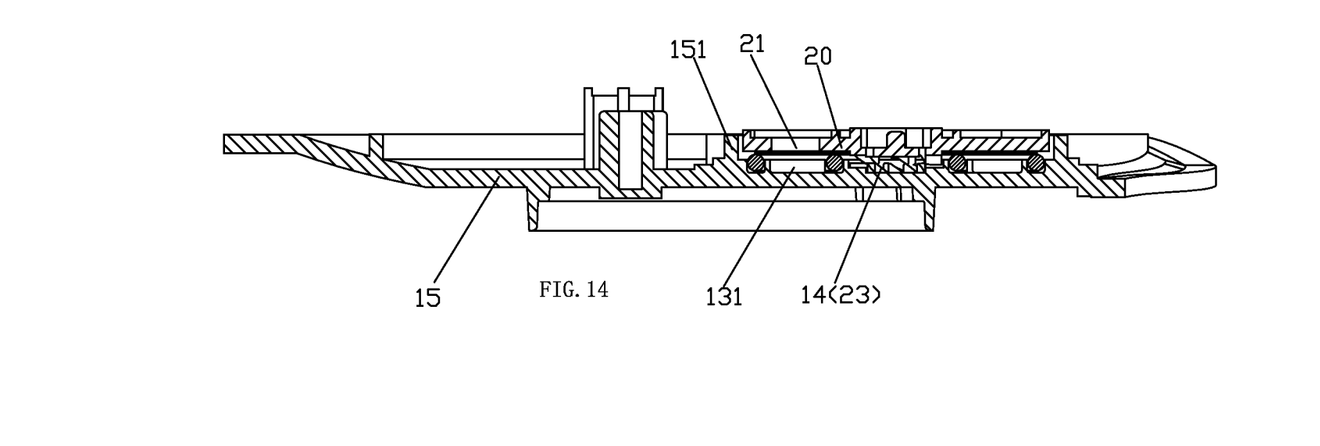
FIG. 14 illustrates a sectional diagram of the water diversion body and the water diversion plate when the button is pressed downwardly.
Figure 15:
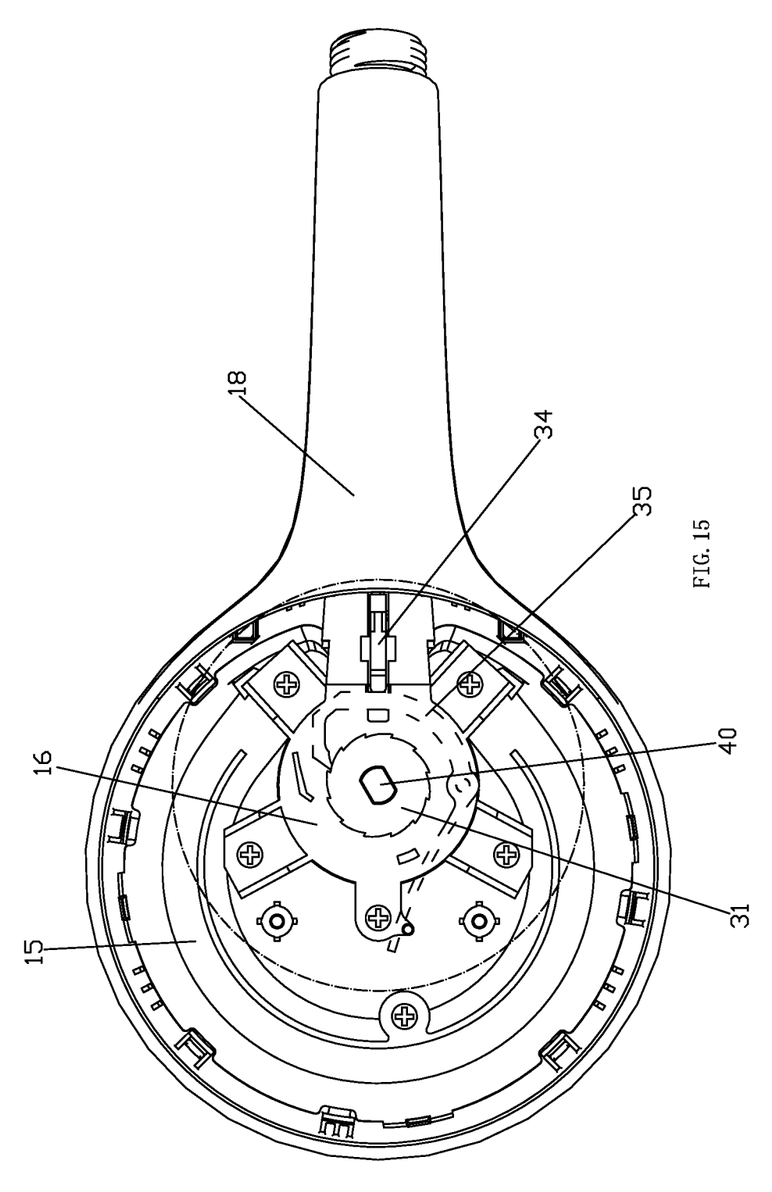
FIG. 15 illustrates a schematic diagram of a part of the shower head when the button is pressed to the end, the dot line indicates the rotation plate and the pawl.
Figure 16:
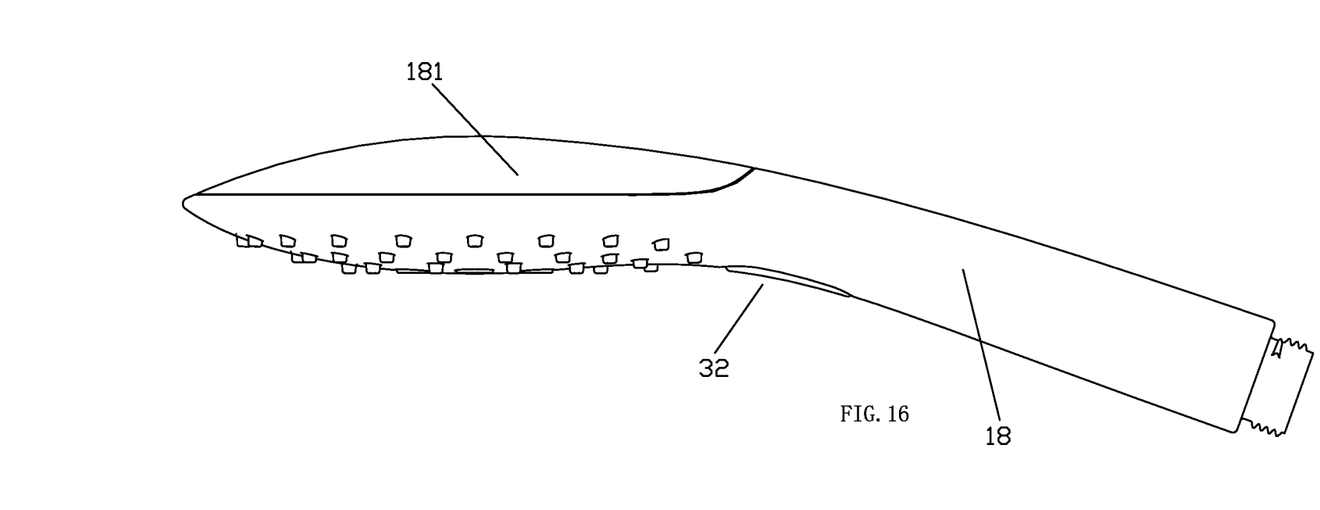
FIG. 16 illustrates a schematic diagram of the shower head when the button is pressed to the end.
Figure 17:
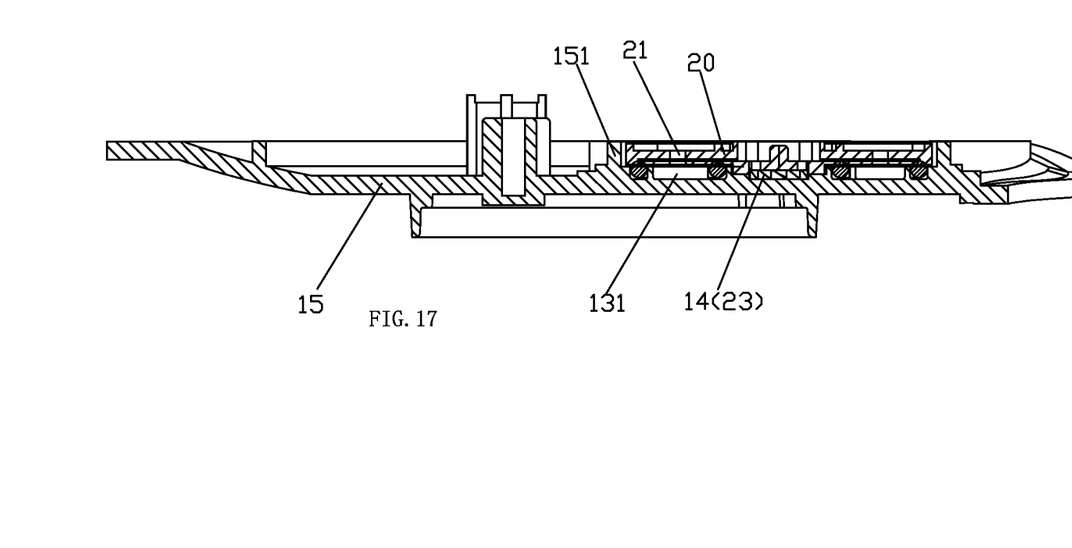
FIG. 17 illustrates a sectional diagram of the water diversion body and the water diversion plate of the shower head when the button is pressed to the end.

The switch process of the switch valve will be described: the first state: the button is in the initial state, the ratchet wheel and the pawl are not moving, the water diversion plate and the sealing ring are closed, referring to FIGS. 9-11. the second state: the button is pressed downwardly, the ratchet wheel and the pawl moves longer and longer in their moving distance, under the work of the gear ring, the water diversion plate and the sealing ring, the water diversion body are separately gradually when rotating, so that it reduces the friction force of the water diversion plate and the sealing ring, thus improving the service life, referring to FIGS. 12-14. the third state: the button is preferred to the end, the ratchet wheel and the pawl rotate about the center in 30°, the height difference of the water diversion plate and the water diversion plate is restored to the initial close state after rotating in 30°, the function water is switched, referring to FIGS. 15~17.

In this embodiment, the fixation portion 10 comprises a water diversion body 15 and a fixation base 16, the end face of the water diversion body is fixedly disposed with a ring 151, the fixation base 16 is fixedly disposed on the water diversion body 15, the space in the ring 151 forms the water diversion cavity 12, the end face of the water diversion body 15 in the ring 151 is the cavity bottom of the water diversion body 12. the fixation base 16 is disposed with an inlet passage 161, the inlet passage 161 is connected to the water diversion cavity 12 to form a part of the inlet waterway 11.

The universal driving shaft 40 is rotatably connected to the fixation base 16. the slide block 34 is in sliding connection with the fixation base 16; the swing base 33 is pivoted joint to the fixation base 16; the fixation base 16 is fixedly disposed with a button base 17, the button 32 is pivoted joint to the button base 17. in detailed, the central portion of the universal driving shaft 40 is protruding outwardly with an annular flange, the universal driving shaft 40 is further disposed with a cylinder section on the top of the flange, a first non-circular section on the top of the cylinder section and a second non-circular section under the cylinder section; the cylinder section is in sliding connection with the pivot hole of the fixation base 16, the flange is supported on the bottom surface of the fixation base 16 in sealing way; a part of the first non-circular section is extending out of the pivot hole of the fixation base 16, the rotation plate 21 is disposed with an assembly hole, the first non-circular section is inserted to the assembly hole in coupling way, then the rotation plate 21 and the universal driving shaft are fixedly connected to finish the fixation connecting; the water diversion plate 20 is disposed with a slide hole, the slide hole is in sliding connection with the second non-circular section in coupling way, so as to achieve synchronously rotation and slidably connecting. The rotation axis of the water diversion plate, the rotation axis of the universal driving shaft, the rotation axis of the rotation plate, the axis of the protruding ring, the axes of the first gear ring and the second gear ring are coincident.

A shower head applied with above switch valve is figured out. The fixation unit 10 further comprises a main body 18, an outlet cover plate 19 and a rear cover 181. The main body 18 is disposed with a hand sleeve pipe and a head portion that are fixedly connected; the rear cover 181 is fixedly connected to the head portion, so that an accommodating room is formed between the head portion and the rear cover 161. The head cover is disposed with a throughout hole, the outlet cover plate 18 is fixedly disposed in the accommodating room and the outlet nozzle of the outlet cover plate 18 is correspondingly running through the throughout hole. The water diversion body 15 and the fixation base 16 are fixedly disposed in the accommodating room, the main body 18, the outlet cover plate 19 and the water diversion body 15 are fixedly connected to form above mentioned at least two diversion waterways.

The fixation base 16 comprises a main portion 162 and an extending section 163 fixedly connected to the main portion 162; the main portion 162 is fixedly connected to the water diversion body and it closes the upper periphery of the ring 161. the center of the extending section 163 is disposed with through groove 164 running through the extending section 163 up and down, the inlet passage 161 comprises an inlet section, two water diversion sections that are respectively disposed at the two sides of the through groove 164 and are respectively connected to the inlet section and an outlet section connected to the two water diversion sections and the water diversion cavity. For manufacturing conveniently, the extending section is concaved with a water groove, a sealing cover 165 is further disposed to cover and close the groove opening of the water groove to make the water groove form a part of the inlet passage 161. the sealing cover 165 is disposed with a portion corresponding to the through groove 164, the sealing cover 165 is disposed with a throughout hole 166. The swing base 33 is pivoted joint to the extending section and is placed in the through groove 164; the slide block 34 is in sliding connection with the throughout hole 166. The through groove 164 is disposed with two separated protruding bases, two protruding bases are disposed with lock grooves with opposite openings, the button base 17 is disposed with two opposite lock catches 171, two lock catches 171 are respectively locked to the lock grooves, so that the button base 17 is fixedly connected in the through groove 164. One end of the bottom portion of the button base 17 is disposed with a protruding, the button is pivoted joint to the button base, the button is disposed at the outer side of the through groove. The connecting position of the head portion and the hand sleeve pipe is disposed with a corresponding hole, the button is exposed to the corresponding hole for a user's pressing.

The hand sleeve pipe of the main body is fixedly disposed with a spindle 182, the inner hole of the spindle 182 is connected to the inlet passage 161 of the fixation base 16, they form the inlet waterway 11 or a part of the inlet waterway 11. Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A switch valve, comprising:
a fixation portion including an inlet waterway, a water diversion cavity connected to the inlet waterway and at least two diversion waterways;
a water diversion plate disposed in the water diversion cavity;
a universal driving shaft rotatably connected to the fixation portion and inserted into the water diversion cavity;
a driving mechanism connected to the universal driving shaft, the water diversion plate and the universal driving shaft rotate synchronously, the water diversion plate is in sliding connection with the universal driving shaft, a bottom of the water diversion cavity being fixedly disposed with a first gear ring, the water diversion plate being fixedly disposed with a second gear ring, the first gear ring being engaged to the second gear ring,
when the driving mechanism drives the water diversion plate to rotate in a preset angle by the universal driving shaft, the water diversion plate slides forth and back along the universal driving shaft, and the inlet waterway is switched to be connected to the diversion waterways by the rotation of the water diversion plate,
wherein the first gear ring comprises first teeth that are arranged in an annular array, the second gear ring comprises second teeth that are arranged in an annular array, the first teeth and the second teeth being ratchets so that the water diversion plate rotates unidirectionally.

2. The switch valve according to claim 1, wherein the driving mechanism comprises a rotation plate and a driving unit, the rotation plate is fixedly connected to the universal driving shaft, the rotation plate is placed on the outer side of the water diversion cavity, the driving unit is connected to the rotation plate for driving the rotation plate to rotate.

3. The switch valve according to claim 1, wherein the bottom of the water diversion cavity has a concave groove, the first gear ring is disposed on the bottom of the concave groove; the bottom surface of the water diversion plate protrudes with a protruding ring, the second gear ring is disposed on the end face of the protruding ring, the protruding ring is coupled to the concave groove.

4. The switch valve according to claim 1, wherein the preset angle is a multiple of central angle degree of each ratchet of the first gear ring, so that when the water diversion plate rotates in a preset angle, the water diversion plate slides forth and back.

5. The switch valve according to claim 2, wherein the rotation plate is disposed with ratchets at the outer side to form a ratchet wheel; the driving unit comprises a button movably connected to the fixation portion, a slide block in sliding connection with the fixation portion and a pawl fixation connected to the fixation portion; the button is connected to the slide block in driving way, the button is configured to drive the slide block to slide, the pawl is disposed with a dangling pawl end, the pawl end abuts against the ratchet of the ratchet wheel, the slide block abuts against the pawl, the slide block slides forth and back to elastically deform the pawl, so that the pawl is configured to drive the ratchet wheel to rotate in a preset angle.

6. The switch valve according to claim 2, wherein the preset angle is a multiple of central angle degree of each ratchet of the first gear ring, so that when the water diversion plate rotates in a preset angle, the water diversion plate slides forth and back along the universal shaft.

7. The switch valve according to claim 5, wherein
the driving unit further comprises a swing base, the button is pivoted to the fixation portion in swinging way, the swing base is pivoted to the fixation portion in swinging way;
one end of the button abuts against one end of the swing base, so that the button is configured to swing the swing base, the other end of the swing base abuts against the slide block, so that the swing base is configured to swing to drive the slide block to slide.

8. The switch valve according to claim 5, wherein the preset angle is a multiple of central angle degree of each ratchet of the first gear ring, so that when the water diversion plate rotates in a preset angle, the water diversion plate slides forth and back along the universal shaft.

9. The switch valve according to claim 7, wherein the swing base is V shaped, the common end of the V shaped swing base is pivoted to the fixation portion, the diverging ends of the V shaped swing base are respectively coupled to the button and the slide block.

10. The switch valve according to claim 7, wherein the fixation unit comprises a water diversion body and a fixation base, the water diversion body and the fixation base are fixedly connected together to form the water diversion cavity, the fixation base has an inlet passage connected to the water diversion cavity to form a part of the inlet waterway, the universal driving shaft is rotatably connected to the fixation base, the slide block is in sliding connection with the fixation base; the swing base is pivoted to the fixation base; the fixation base is fixedly disposed with a button base, the button is pivoted to the button base.

11. The switch valve according to claim 7, wherein the preset angle is a multiple of central angle degree of each ratchet of the first gear ring, so that when the water diversion plate rotates in a preset angle, the water diversion plate slides forth and back along the universal shaft.

12. The switch valve according to claim 9, wherein the preset angle is a multiple of central angle degree of each ratchet of the first gear ring, so that when the water diversion plate rotates in a preset angle, the water diversion plate slides forth and back along the universal shaft.

13. A shower head applied with the switch valve according to claim 10, wherein the fixation unit further comprises a main body, an outlet cover plate and a rear cover, the main body and the rear cover are fixedly connected to form an accommodating room, the outlet cover plate, the water diversion body and the fixation base are fixedly connected in the accommodating room, the main body, the outlet cover plate and the water diversion body are fixedly connected to form the at least two diversion waterways.

14. The switch valve according to claim 10, wherein the preset angle is a multiple of central angle degree of each ratchet of the first gear ring, so that when the water diversion plate rotates in a preset angle, the water diversion plate slides forth and back along the universal shaft.

* * * * *

UNITED STATES PATENT AND TRADEMARK OFFICE
CERTIFICATE OF CORRECTION

PATENT NO. : 9,829,116 B2
APPLICATION NO. : 14/837517
DATED : November 28, 2017
INVENTOR(S) : Wencong Xu Page 1 of 1

It is certified that error appears in the above-identified patent and that said Letters Patent is hereby corrected as shown below:

On the Title Page

Item (73) Assignees should read: XIAMEN SOLEX HIGH-TECH INDUSTRIES CO., LTD. Xiamen (CN)

Signed and Sealed this
Fifth Day of March, 2019

Andrei Iancu
*Director of the United States Patent and Trademark Office*